(12) United States Patent
Sakai

(10) Patent No.: US 6,741,438 B2
(45) Date of Patent: May 25, 2004

(54) LIGHTNING-ARRESTING SYSTEM WITH UNDERGROUND NETWORK

(76) Inventor: Zenji Sakai, 3237, Fukaishimizucho, Sakai-shi, Osaka 599-8273 (JP)

( * ) Notice: Subject to any disclaimer, the term of this patent is extended or adjusted under 35 U.S.C. 154(b) by 333 days.

(21) Appl. No.: 09/888,475

(22) Filed: Jun. 26, 2001

(65) Prior Publication Data

US 2002/0101699 A1 Aug. 1, 2002

(30) Foreign Application Priority Data

Jan. 29, 2001 (JP) ........................................ 2001-077274

(51) Int. Cl.[7] .................................................. H02H 1/04
(52) U.S. Cl. ............................................. 361/117; 174/3
(58) Field of Search ........................... 174/2, 3; 361/56, 361/111, 117, 118

(56) References Cited

U.S. PATENT DOCUMENTS 4,180,698 A  * 12/1979  Carpenter, Jr. .................. 174/2
5,365,398 A  * 11/1994  Briet ............................ 361/117
6,167,896 B1 *  1/2001  Smith ........................... 135/96
6,498,291 B2 * 12/2002  Brammer ....................... 174/3

FOREIGN PATENT DOCUMENTS

JP          11-266534          9/1999          ............. H02J/3/00

OTHER PUBLICATIONS

English Translation of Japanese Patent Abstract JP-A-11-266534

* cited by examiner

*Primary Examiner*—Ronald W. Leja
(74) *Attorney, Agent, or Firm*—Michael D. Bednarek; Shaw Pittman LLP

(57) ABSTRACT

A lightning-arresting system includes a lightning rod and an underground conductive network connected to the rod. The network includes a plurality of rectangular meshes or radially extending lines. The network is laid under a structure protected from lightning strikes. The coverage area of the network is greater than the building area of the structure to be protected.

6 Claims, 5 Drawing Sheets

LIGHTNING-ARRESTING SYSTEM WITH UNDERGROUND NETWORK

BACKGROUND OF THE INVENTION

1. Field of the Invention

The present invention generally relates to a system for avoiding lightning strikes. In particular, it relates to a lightning arresting system including a lightning rod and a conductive underground network connected to the rod.

2. Description of the Related Art

As is known, lightning occurs when a region of the atmosphere acquires a potential difference great enough to overcome the resistance of the air. Specifically, when lightning occurs, an electric dipole structure is produced in a cloud in a manner such that a large net-positive charge exists in the upper region of the cloud and a large net-negative charge in the lower region, as shown in FIG. 1. (To be precise, there exists a small net-positive charge in the lowest region of the cloud.)

A cloud-to-ground flash includes at least two strokes: a leader stroke and a return stroke. A leader stroke (carrying a negative charge) passes from cloud to ground.

The leader stroke is often stepped and has many branches extending out from the main channel. As it nears the ground, it induces an opposite charge at the point AP to be struck (called "antipole point" hereinafter). Then, a return stroke (carrying a positive charge) from ground to cloud is generated through the main channel.

The two strokes will meet at a certain height above the ground. At this juncture, the cloud is short-circuited to the ground and a highly luminous return stroke passes through the channel to the cloud. A typical lightning flash involves a potential difference between cloud and ground of several hundred million volts, with peak currents on the order of 20,000 amperes.

Lightning strikes are deadly dangerous so that lightning rods are often used for protecting structures from being struck. As shown in FIG. 1, a lighting rod 1, which is made of copper for example, is usually disposed at a high point on a structure ST to be protected. The lighting rod 1, connected to the ground GR by low-resistance cables 2, is expected to intercept flashes and transmit their current to the ground safely.

The conventional lightning rod 1 is simply put at the top of the structure ST since it is uncritically believed that lightning tends to strike the highest object in the vicinity. In this connection, a theory says that a lightning rod can provide a cone of protection whose ground radius approximately equals its height above the ground (that is, the protection angle is about 45 degrees.) Actually, however, structures are sometimes struck and damaged by lightning, even though they are within the protection cone. This shows that conventional lighting rods are not reliable enough to protect structures from lighting strikes.

SUMMARY OF THE INVENTION

The present invention has been proposed under the circumstances described above. The inventor of the present invention is of the opinion that the cause of the failure of the conventional lightning rods to intercept lightning resides in the uncritically simple grounding manner.

It is, therefore, an object of the present invention to provide a lightning-arresting system designed to provide more reliable protection against lightning than is conventionally possible.

According to the present invention, there is provided a lightning-arresting system including a lightning rod and an underground conductor connected to the rod, wherein the underground conductor is spread to cover a protection area.

Preferably, the underground conductor may include a conductive network.

Preferably, the network may include a plurality of rectangular meshes each having a side length which is no greater than 1 meter.

Preferably, the plurality of rectangular meshes may include meshes different in size from each other.

Preferably, the meshes different in size may include an inner mesh and an outer mesh, wherein the inner mesh is greater than the outer mesh.

The lightning-arresting system may further include a connection cable which connects the lightning rod to the underground conductor. The connection cable may be connected to the center of the underground conductor.

The lightning-arresting system may further include a conductive post which connects the lightning rod to the underground conductor. The conductive post may be one of the vertical steel supports of the structure to be protected from lightning.

In the above case, the underground conductor may be formed with an opening for avoiding interference with the conductive post.

Preferably, the underground conductor may be laid under the structure to be protected, wherein the underground conductor is larger than the building area of the structure.

The lightning-arresting system of the present invention may further include a common connection point to which the lightning rod is connected. In this case, the underground conductor may include a plurality of linear conductive members or lines each extending radially from the common connection point.

Preferably, each conductive line may include some branches.

Other features and advantages of the present invention will become apparent from the detailed description given below with reference to the accompanying drawings.

DETAILED DESCRIPTION OF THE PREFERRED EMBODIMENTS

The preferred embodiments of the present invention will be described below with reference to the accompanying drawings.

Figure 2:
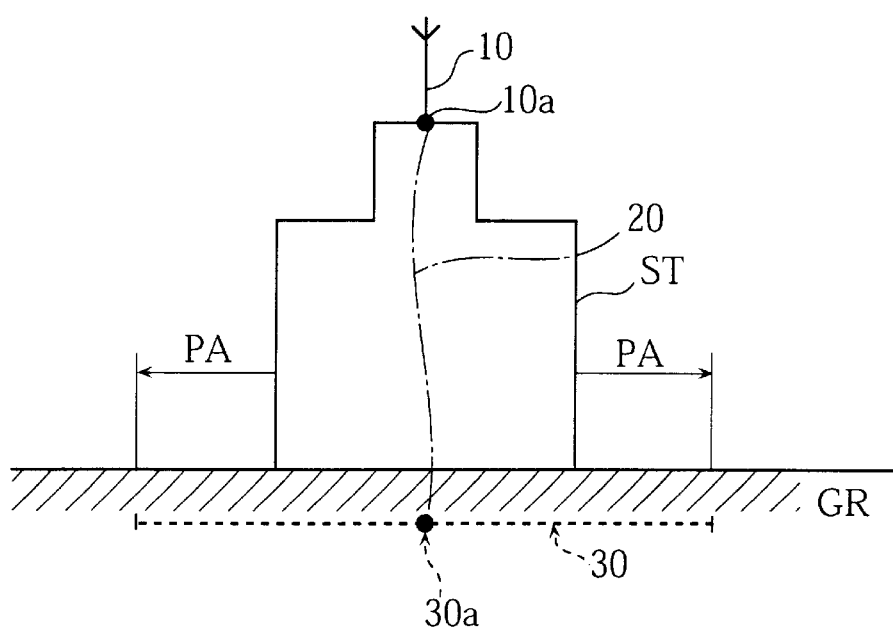
FIG. 2 is a side view illustrating a lightning-arresting system according to the first embodiment of the present invention.
Figure 3:
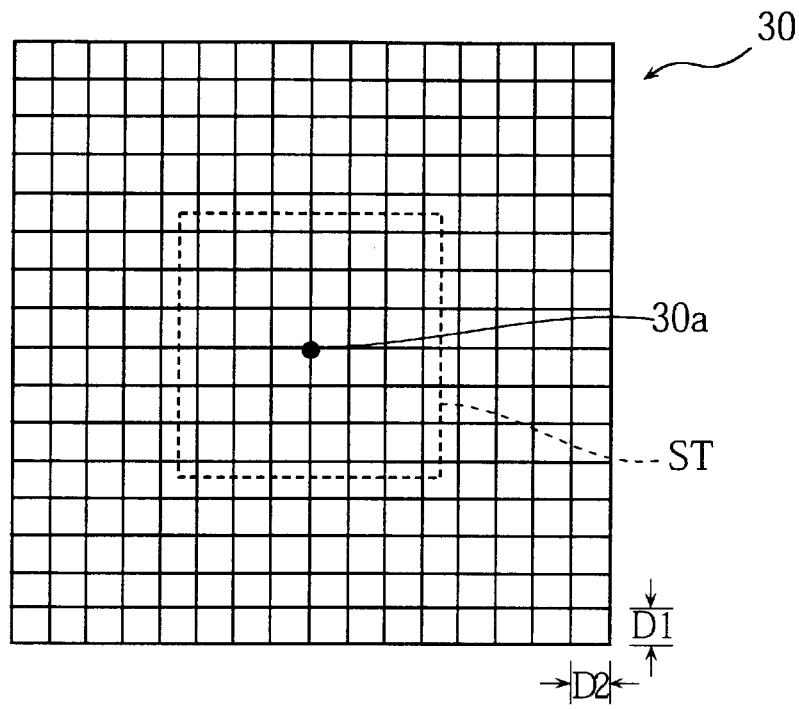
FIG. 3 is a plan view showing an example of underground conductive network used for the system of FIG. 2.

FIGS. 2 and 3 show a lighting-arresting system according to a first embodiment of the present invention. As shown in FIG. 2, the system basically includes a lightning rod 10, a low-resistance cable 20 and an underground network 30. The rod 10 is connected to the network 30 via the cable 20.

The rod 10 may be a commercially available lightning rod made of e.g., copper. As shown in FIG. 2, the rod 10 is put at the top of a structure ST. The cable 20 extends from the connection end 10a of the rod 1 to the central connection point 30a of the network 30 (see also FIG. 3).

The underground network 30, as shown in FIG. 3, is a generally square grid of conductive wires (made of copper for example) which may be naked, plated or insulated. For the purposes of preventing corrosion, the conductive wires may preferably be plated or insulated.

Figure 4:
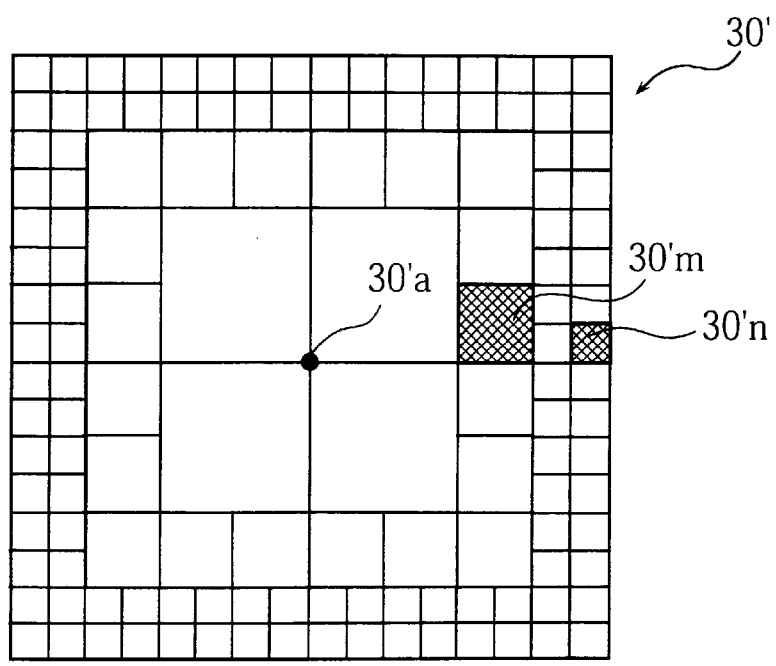
FIG. 4 shows another example of underground network used for the system of FIG. 2.

The mesh size (specified by side lengths D1, D2) of the grid may be as small as possible, though a practical mesh size may be about 1 m×1 m. In the first embodiment, each mesh is depicted as having the same size, though the present invention is not limited to this. For instance, as shown in FIG. 4, an inner mesh 30'm may be greater than an outer mesh 30'n (where the "inner" mesh 30'm is a mesh located closer to the central connection point 30'a than is the "outer" mesh 30'n). In another application, an inner mesh may be smaller than an outer mesh, as opposed to the example shown in FIG. 4.

Referring back to FIG. 2, the underground network 30 is laid to cover the prescribed protection area PA which is larger than the building area of the structure ST (see also FIG. 3). Due to the conductivity of the network wires, the electric potential over the area PA, which could otherwise be uneven, is leveled off. The lightning rod 10 is held at substantially the same potential as the network 30 due to the connection by the low-resistance cable 20.

With the above arrangement, the lightning-arresting system of the present invention can protect the structure ST more reliably against lightning strikes than the conventional system. The reason is as follows.

Figure 1:
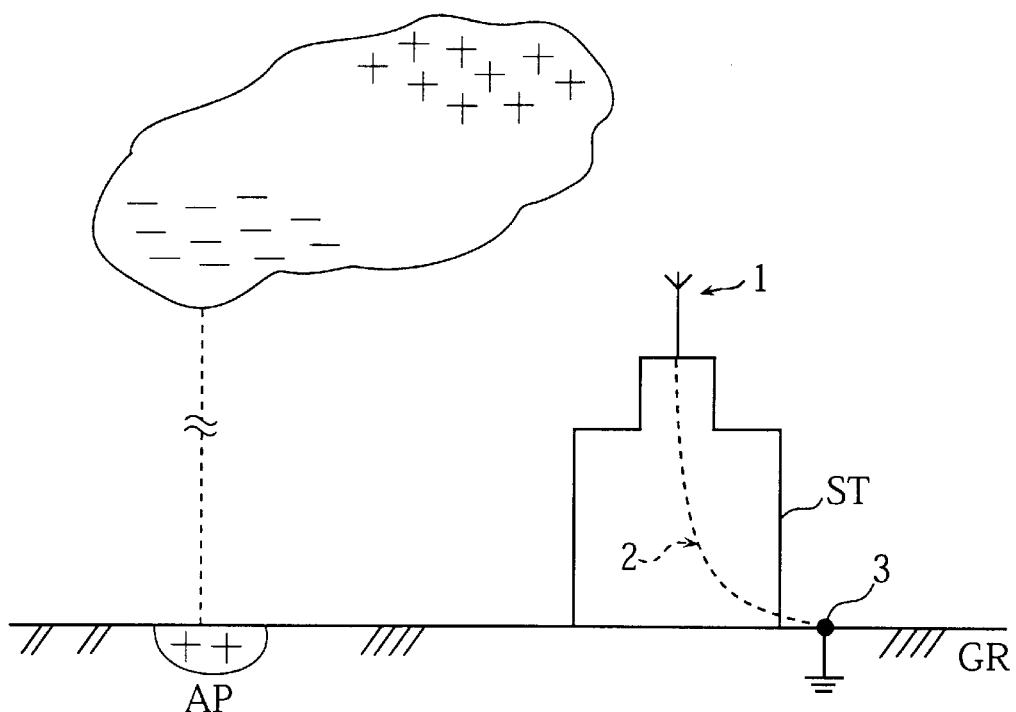
FIG. 1 illustrates the mechanism of lightning occurrence, while also showing a conventional lighting-arresting system.

As previously stated with reference to FIG. 1, an antipole point will appear on the ground GR as a charged thundercloud is approaching the structure ST. In the conventional case, the grounding of the lightning rod 1 is provided simply by embedding e.g. a conductive electrode in the ground GR. In comparison with the structure ST (which may be a large multi-story building), the buried electrode is usually very small. Thus, it is much more probable that the induced antipole point will be led onto the structure ST as the charged thundercloud is drifting across the sky, rather than brought to the installation point of the conductive electrode. Therefore, even with the conventional lightning rod, lightning may strike the structure ST itself rather than be conducted to the ground GR through the lightning rod.

On the other hand, according to the lightning-arresting system of the present invention, the underground conductive network 30 can cover a wide area (protection area) around the structure ST. Thus, it is more probable that the antipole point AP will be brought to the protection area PA rather than appear on the structure ST. Once the antipole point AP comes into the protection area PA, it is caught by the network 30, and brought to the sharpened top end of the lightning rod 10 via the cable 20 (it should be noted here that when a conductive system is held at the same potential, concentration of charge will occur at a pointed end). As a result, subsequent lightning will take place between the charged thundercloud and the lightning rod 10, so that the high current is safely conducted to the ground GR.

Figure 5:
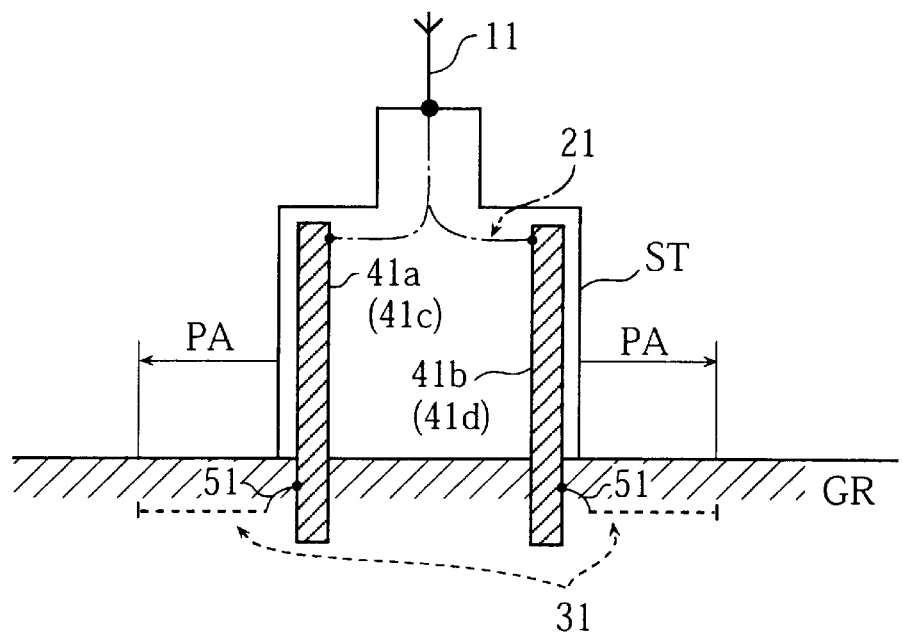
FIG. 5 is a sectional side view showing a lightning-arresting system according to the second embodiment of the present invention.
Figure 6:
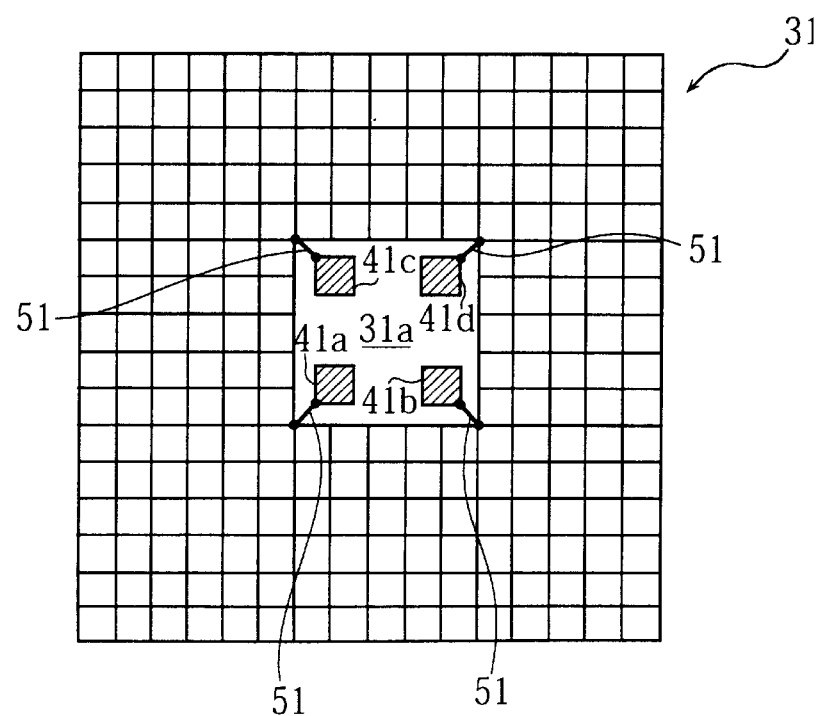
FIG. 6 is a plan view showing an example of underground conductive network used for the system of FIG. 5.

Reference is now made to FIGS. 5 and 6 illustrating a lightning-arresting system according to a second embodiment of the present invention. In this system, as illustrated, the connection between a lightning rod 11 and an underground conductive network 31 is made by utilizing the steel frame of the structure ST. Specifically, the lightning rod 11 is connected to the upper portions of four vertical steel posts 41a–41d (only two shown in FIG. 4) of the structure ST via conductive cables 21. The four posts 41a–41d are driven into the ground GR deeper than the network 31, and connected to the network 31 via connection cables 51 in the ground GR. As shown in FIG. 6, the grid-like conductive network 31 is formed with a rectangular opening 31a to allow the passage of the posts 41a–41d.

Figure 7:
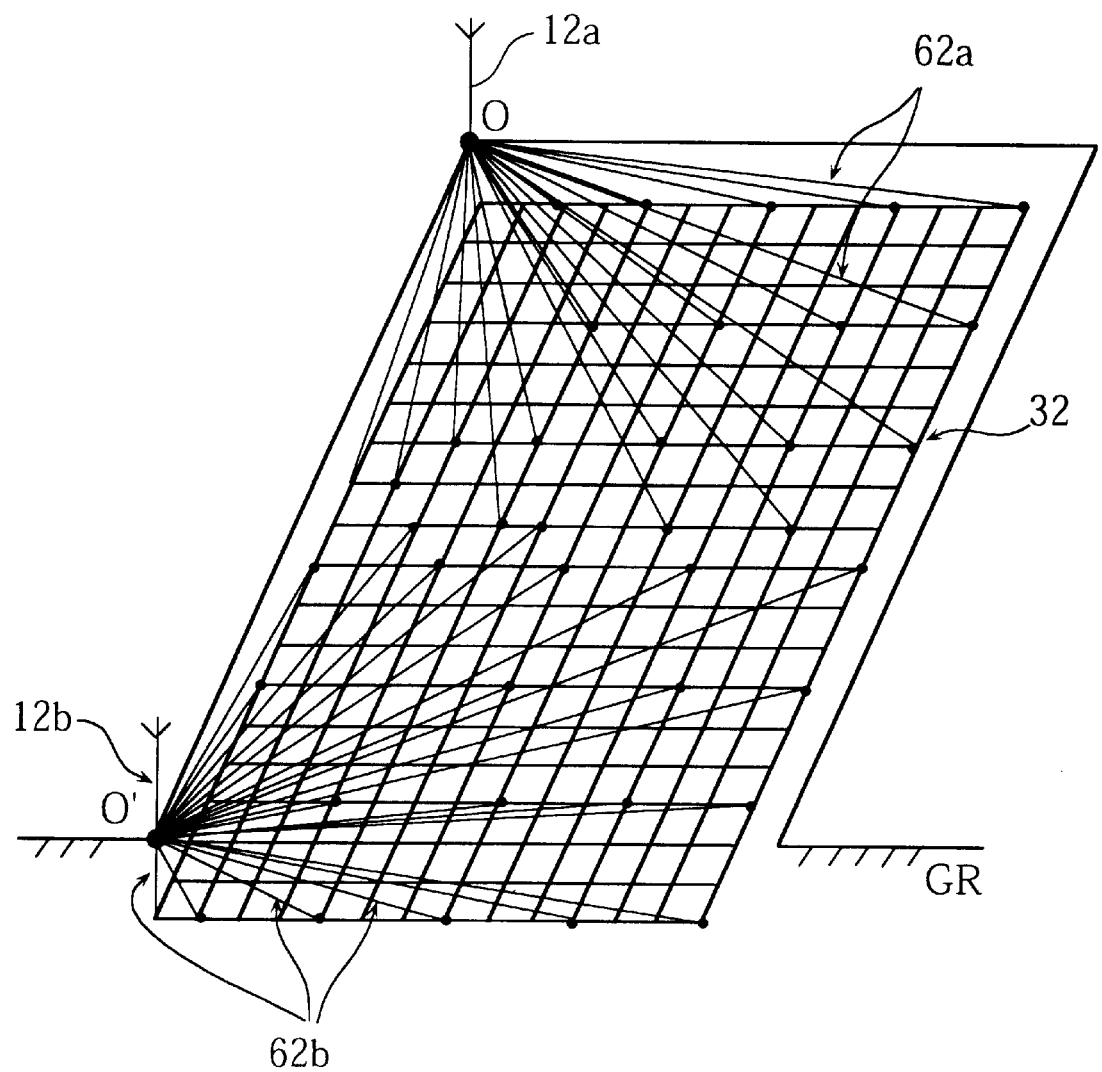
FIG. 7 is a perspective view showing a lightning-arresting system according to the third embodiment of the present invention.

FIG. 7 shows a lightning-arresting system according to a third embodiment of the present invention. The system of this embodiment may advantageously be applied to an open space, as in a golf links, where there is good visibility.

According to the third embodiment, use is made of a plurality of unhorizontal conductive cables or lines in addition to a grid-like underground network to conduct an induced antipole point to a lightning rod. Specifically, as shown in FIG. 7, a grid-like conductive network 32 is embedded in the ground GR to cover the prescribed protection area. In addition, a suitable number of unhorizontal conductive cables 62a, 62b are also embedded in the ground, to be connected at their one end to the network 32. At the other end, the conductive cables 62a are commonly connected to the lower end O of a first lightning rod 12a, while the remaining cables 62b are commonly connected to the lower end O' of a second lightning rod 12b. As viewed from the above, these conductive cables 62a or 62b radially extend from the lower end O or O'.

With the use of the additional conductive cables 62a and 62b, the lightning rods 12a and 12b can intercept harmful lightning more reliably than when only the grid-like network 32 is used. In an application, however, it may suffice to use only the unhorizontal conductive cables 62a and 62b, and therefore the network 32 can be omitted.

Figure 8:
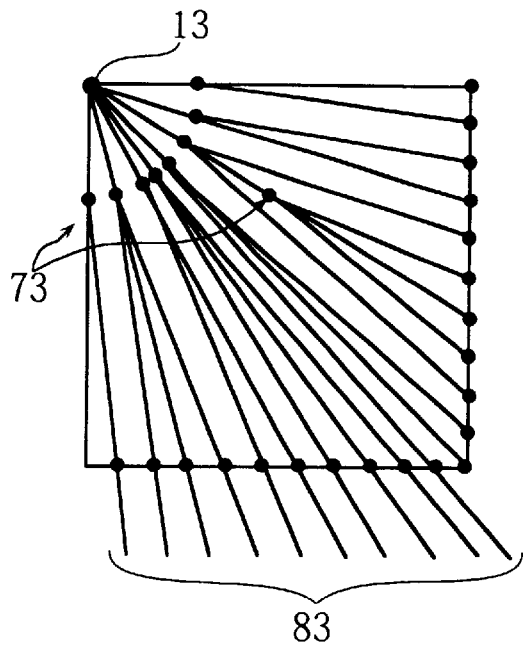
FIGS. 8 and 9 show examples of underground networks used for carrying out the present invention.
Figure 9:
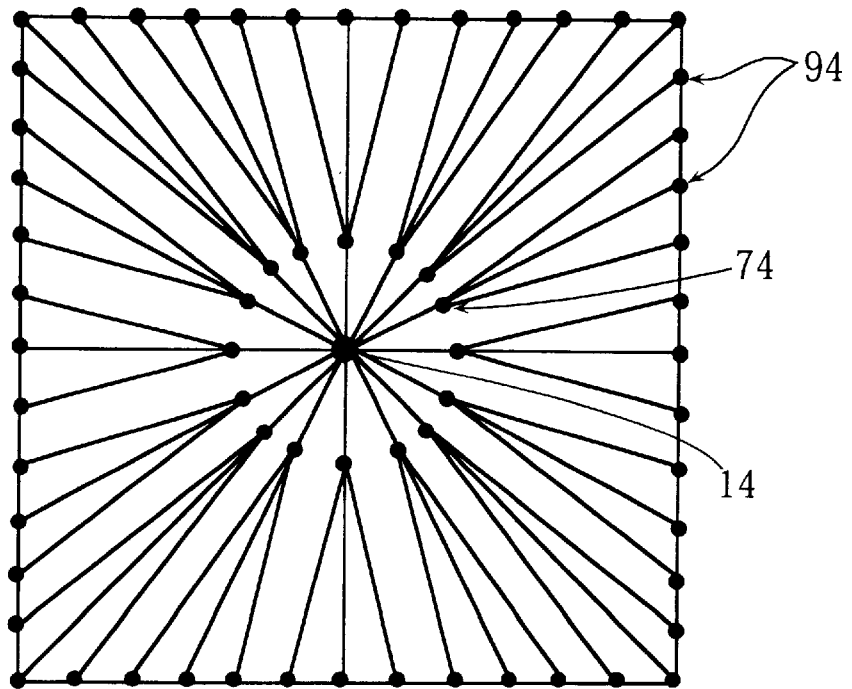

The radial layout of the unhorizontal conductive cables can have many variations. FIGS. 8 and 9 show examples. In them, a pattern of conductive cables radially extending from a lightning rod 13 or 14 has a prescribed number of ramification points 73 or 74 at which two or more conductive segments branch off from one conductive segment. As shown in FIG. 9, the terminals 94 of the respective branches may be connected to each other. Alternatively, as shown in FIG. 8, some of the branches may have extensions 83 protruding from the rectangular, main protection area.

The present invention being thus described, it is obvious that the same may be varied in many ways. For instance, the underground network may be replaced by a conductive sheet or plate having no meshes. Such variations are not to be regarded as a departure from the spirit and scope of the present invention, and all such modifications as would be obvious to those skilled in the art are intended to be included within the scope of the following claims.

What is claimed is:

1. A lightning-arresting system comprising:
  a lightning rod; and
  an underground conductor connected to the rod and spread to cover a protection area, the underground conductor comprising a conductive network that includes a plurality of rectangular meshes each having a side length which is no greater than 1 meter;
  wherein the plurality of rectangular meshes include meshes different in size from each other.

2. The system according to claim 1, wherein the meshes different in size include an inner mesh and an outer mesh, the inner mesh being greater than the outer mesh.

3. The system according to claim 1, further comprising a connection cable with connects the lightning rod to the underground conductor.

4. The system according to claim 3, wherein the connection cable is connected to a center of the underground conductor.

5. The system according to claim 1, wherein the underground conductor is laid under a structure on which the lightning rod is set up, the underground conductor being larger than a building area of the structure.

6. A lightning-arresting system comprising:

a lightning rod;

an underground conductor connected to the rod and spread to cover a protection area; and a conductive post which connects the lightning rod to the underground conductor;

wherein the underground conductor is formed with an opening for avoiding interference with the conductive post.

* * * * *